(12) United States Patent
Salter et al.

(10) Patent No.: US 11,653,642 B2
(45) Date of Patent: May 23, 2023

(54) VEHICULAR PEST REPELLER

(71) Applicant: FORD GLOBAL TECHNOLOGIES, LLC, Dearborn, MI (US)

(72) Inventors: Stuart C. Salter, White Lake, MI (US); Jeffrey R. Seaman, Brownstown, MI (US); Paul Kenneth Dellock, Northville, MI (US); Annette L. Huebner, Highland, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 354 days.

(21) Appl. No.: 17/169,746

(22) Filed: Feb. 8, 2021

(65) Prior Publication Data
US 2022/0248659 A1    Aug. 11, 2022

(51) Int. Cl.
*A01M 29/18* (2011.01)
*G07C 9/00* (2020.01)
*G06V 20/56* (2022.01)
*G06V 40/10* (2022.01)

(52) U.S. Cl.
CPC ............. *A01M 29/18* (2013.01); *G06V 20/56* (2022.01); *G06V 40/10* (2022.01); *G07C 9/00309* (2013.01); *G07C 2009/00365* (2013.01)

(58) Field of Classification Search
CPC .. A01M 29/18; A01M 2200/01; G06V 20/56; G06V 40/10; G07C 9/00309; G07C 2009/00365; B60Q 9/00; B60R 16/023
See application file for complete search history.

(56) References Cited

U.S. PATENT DOCUMENTS

| | | | |
|---|---|---|---|
| 4,337,592 A | 7/1982 | Hasegawa | |
| 7,324,408 B2 | 1/2008 | Cilliers | |
| 10,306,880 B2 | 6/2019 | Teh et al. | |
| 2015/0084751 A1 | 3/2015 | Crawford | |
| 2022/0248659 A1* | 8/2022 | Salter | G06V 40/10 |
| 2023/0054205 A1* | 2/2023 | Salter | B62D 43/02 |

FOREIGN PATENT DOCUMENTS

| | | | | |
|---|---|---|---|---|
| CN | 114903026 A | * | 8/2022 | ............ A01M 29/18 |
| DE | 102022102100 A1 | * | 8/2022 | ............ A01M 29/18 |
| JP | 2011212006 A | | 10/2011 | |
| KR | 102464127 B1 | * | 11/2022 | ............ A01M 29/22 |

* cited by examiner

*Primary Examiner* — Daniel Pihulic
(74) *Attorney, Agent, or Firm* — Frank L. Lollo; MacMillan, Sobanski & Todd, LLC

(57) ABSTRACT

In-vehicle transducers (speakers, sound exciters, or vibrating window panels) are used to generate the ultrasonic waves to repel pests, without driving away family pets or exposing nearby people. In one preferred method, a pest deterrent mode is activated in response to a first user command by emitting ultrasonic soundwaves from a transducer driven by an onboard audio system. A region around the vehicle is monitored for human-related activity within the region. The emission of ultrasonic soundwaves is deactivated when the human-related activity is detected. Emission of the ultrasonic soundwaves is resumed when the human-related activity is no longer detected. Then the pest deterrent may be set to a deactivated mode in response to a second user command.

20 Claims, 4 Drawing Sheets

VEHICULAR PEST REPELLER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to repelling pests away from a parked, unattended vehicle, and, more specifically, to an ultrasonic pest deterrent that automatically avoids exposure to humans and their pets.

Some types of passenger vehicles provide for removable roof and doors for recreational uses such as off-road travel and outdoor camping or tailgating. Such a vehicle may be used to store food at times when it is not occupied. In addition, bits of food may be inadvertently dropped underneath seats or other areas during normal use. In either case, the food may attract pests to a parked vehicle, especially when people and dogs/cats are not around. Mice, rats, squirrels, raccoons, deer, bear, and insects attracted to the food may create significant vehicle damage.

Use of ultrasonic sound is known for driving away pests. However, such sound can be bothersome to unintended targets such as people or their pets (e.g., the family dogs or cats). Furthermore, known ultrasonic pest repellers have been continuously active when they are turned on, resulting in undesirable levels of power drain on the vehicle battery.

SUMMARY OF THE INVENTION

In one aspect of the invention, a method is provided for deterring pests around a vehicle. A pest deterrent mode is activated in response to a first user command by emitting ultrasonic soundwaves from a transducer driven by an onboard audio system. A region around the vehicle is monitored for human-related activity within the region. The emission of ultrasonic soundwaves is deactivated when the human-related activity is detected. Emission of the ultrasonic soundwaves is resumed when the human-related activity is no longer detected. Then the pest deterrent may be set to a deactivated mode in response to a second user command.

DETAILED DESCRIPTION OF PREFERRED EMBODIMENTS

Figure 1:
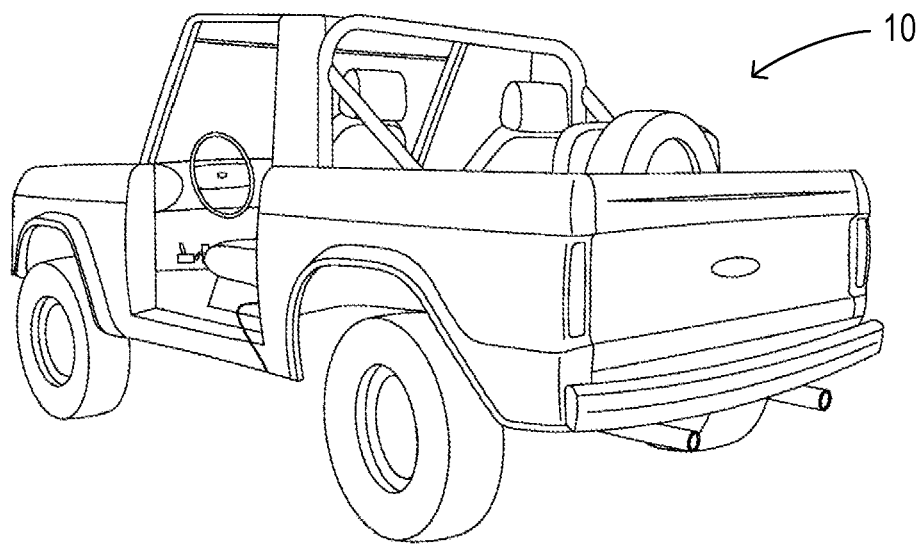
FIG. 1 is a perspective view of an open vehicle in which a pest control system of the invention may be deployed.

In some embodiments, normally available transducers (e.g., speakers, sound exciters, vibrating body or glass panels) on a vehicle are used to generate ultrasonic sounds for repelling pests. In some embodiments, the function may turn on and off automatically in order to avoid having it bother or drive away the family pets. The frequency ranges of hearing for various potential pests (e.g., mice, rats, raccoons, hedgehogs, and insects) extend well beyond the normal response for humans. Nevertheless, there may be physiological effects upon humans, especially with longer periods of exposure. Furthermore, there is an overlap of frequencies between family pets (e.g., dog or cat) with pests that it is desired to deter (raccoon, rat, mouse, insects).

In order to provide flexibility to users of a pest repeller system, generation of ultrasonic sounds in some embodiments may be controlled according to four different modes. In a first mode, emission of ultrasonic noises may be continuous from the time where a user activates a device. In a second mode, ultrasonic emission occurs only (or primarily only) at night when pests tend to be active (as determined by a day/night ambient light sensor, or ALS). In a third mode, ultrasonic emission occurs only when people (e.g., a vehicle owner) are farther than a predetermined distance (e.g., 50 ft) from the vehicle. In a fourth mode, ultrasonic emission occurs only when both the people and any pet animals (e.g., wearing wireless collars, such as a collar with an RF tag or a Bluetooth® node, such as Bluetooth® Low Energy or BLE, or an Ultra-Wide Band or UWB node) are farther than a predetermined distance from the vehicle. For example, known Phone-as-a-Key (PaaK), BLE, and remote entry fob systems can determine the distance of an owner or other persons from vehicle as well the distance of pets (via BLE collar) from the vehicle.

In some embodiments, various vehicle sensor systems for remote sensing of objects (e.g., using microphones, cameras, or capacitive sensors) can be used to assess whether dogs are nearby. If a dog is nearby then emission of ultrasound may be fully suspended (since the presence of the dog may itself repel pests), or frequencies most likely to irritate a dog (e.g., around 45 kHz) may be suppressed. Alternatively, the irritating frequencies (e.g., above 45 kHz) may be emitted and the dog monitored to determine whether agitation occurs (e.g., barking) before a decision is made to suppress them.

Detection of pests and/or pets can include use of remote sensing. For example, Macro Capacitive Sensors (MCS) of the type used in object detection for parking assistance or cross-traffic monitoring which are often mounted on an exterior of a vehicle, can be activated while parked for short fixed periods of time to detect pests, pets, or humans without excessive power consumption. Cameras or other image sensors can also be used for remote sensing. For example, detection of an object using an MCS can be used to trigger cameras to capture images to be assessed for better classification of detected objects. Depending on a type of pest that may be detected, a corresponding response can be initiated, such as 1) emitting ultrasonic soundwaves, 2) honking a horn of the vehicle at a large animal, 3) generating a loud artificial dog bark, 4) turning on perimeter lights to scare off a pest, or 5) using the speakers to generate a verbal command to scare a pest or alert the campers (e.g., "bear spotted"). The MCS could be on a polling rate that can be slowed during the day and increased at night. The vehicle can be set to include an intermittent chime and/or flashing light to let the owner know when it is working.

A vehicle may typically have various sound transducers that can be utilized to generate ultrasonic soundwave emission. There are usually multiple speakers of an audio entertainment system disposed throughout the vehicle interior for reproducing music and other audio content. The speakers may include tweeters for reproducing higher frequencies, with a capability typically extending into the ultrasonic range. The speakers may be less efficient at ultrasonic frequencies, but this can be compensated by increasing the amplitude of the ultrasonic signal source driving the speakers. Ultrasonic pest repellent works mainly by direct line of sight but since protection of the vehicle interior is what is needed, the existing speakers can be very effective. Further, depending on regulations in the country sold, battery electric vehicles may have exterior speakers for generating noise when in motion. This exterior speaker system may be used to generate exterior ultrasonic signals. Other auxiliary speakers such a Bluetooth speakers paired with the audio system can also be used.

Other transducers that may be present on a vehicle and that may be used for repelling pests include vibrating panels (e.g., body panels and/or glass panels such as a backlite or windshield) or exterior ultrasound emitters used for object detection by driver assistance systems.

In some embodiments, an additional capability (that may be especially useful in regions of warmer climates) may be provided to increase protection by utilizing ultraviolet light (UV) light to eliminate (i.e., repel or exterminate) and/or identify insects. For example, exposure to ultraviolent light in the C-band (UVC) can be fatal to scorpions within about 5 minutes. UVC (and/or UV A-Band or B-band) light will also make scorpions fluoresce for easy detection. As a UVC source, UVC LEDs can be packaged together with ambient courtesy lighting modules in the vehicle interior (e.g., on a PCB-based lighting module that is LIN addressable in order to select normal lighting or UVC light). An optical-grade silicone optic may be used in order to pass the UVC light. Integration with courtesy lighting modules takes advantage of the fact that the ambient lights already illuminate footwells, underneath seats, and the inside of door handles insects might hide. UVC lights can be activated automatically upon a user's approach to the vehicle or manually using a mobile device. A timer (e.g., a 5-minute timer) can be used to initiate a UVC cycle, and a notification can be sent to the user (e.g., on a touchscreen of a PaaK device). When an occupancy sensor detects a person in a seat, then the UVC feature would turn off.

Figure 2:
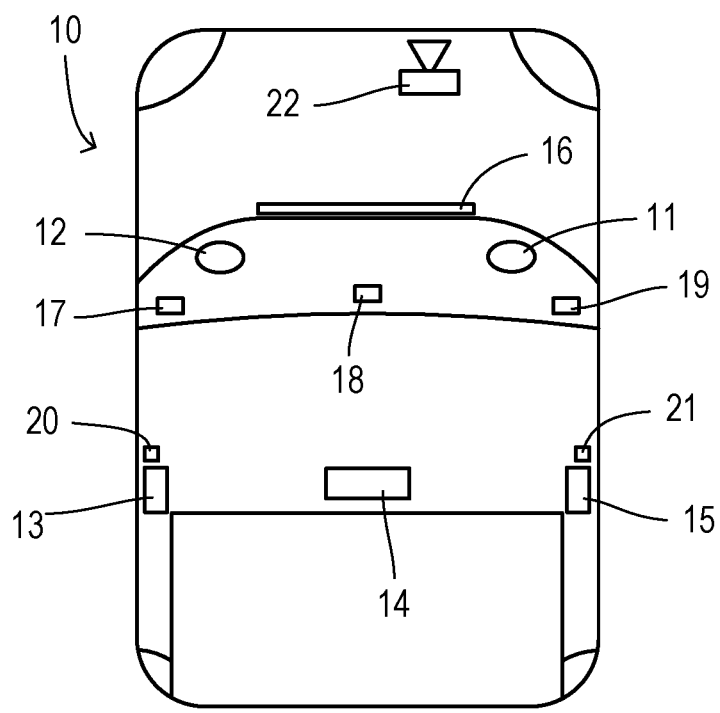
FIG. 2 is a top view of a vehicle apparatus including transducers and lighting elements.

FIG. 1 depicts a vehicle 10 of a type with detachable doors and/or roof that may be used for recreational purposes such as camping. Such a vehicle may be left open and unoccupied in an outdoor environment, making it vulnerable to encroachment by animal and insect pests. To repel pests, vehicle 10 implements an ultrasonic pest repeller using some components as shown in FIG. 2. Sound transducers in vehicle 10 include loudspeakers 11-15 disposed throughout the passenger cabin (at least some of which may include a tweeter capable of sound production up to about 50 kHz) and an exciter 16 incorporated into a glass panel such as the windshield. Ultraviolet light (e.g., UVC) LEDs 17-21 are also disposed throughout the passenger cabin (e.g., within interior trim components of a dashboard and near door openings) which can optionally be used to eliminate certain kinds of pests. A car horn 22 can be used to generate audible (i.e., non-ultrasonic) sounds in some embodiments to scare away animal pests.

Figure 3:
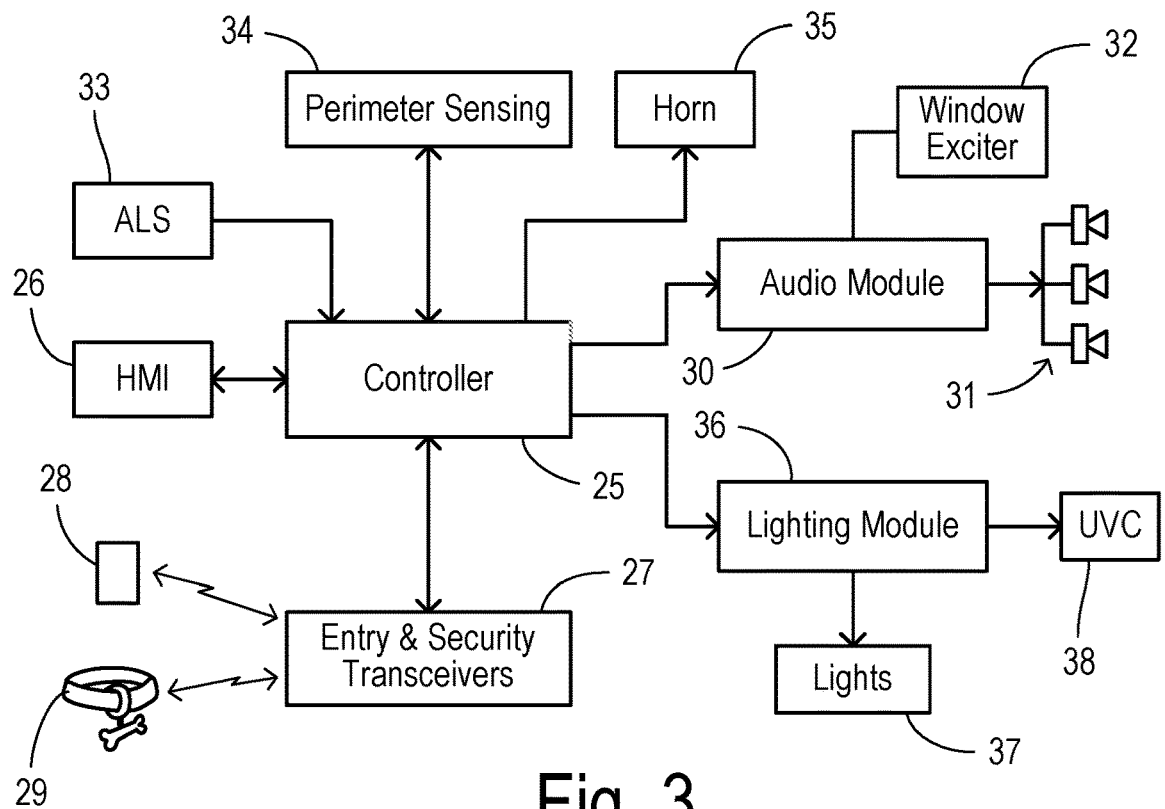
FIG. 3 is a block diagram showing one preferred embodiment of a pest control system.

One preferred example of a pest repellant system for a vehicle is shown in greater detail in FIG. 3. A controller 25 (e.g., a programmable processor system) is coupled to a human-machine interface (HMI) 26 and to one or more wireless transceivers 27 used for security, keyless entry, remote control (e.g., remote start), communication, and/or other purposes. Transceivers 27 communicate wirelessly with remote, mobile devices 28 (e.g., a key fob or a user's smartphone) and/or a wireless tag or Bluetooth (BLE) pet-tracking device 29, such as a dog collar. Transmissions to and/or from transceivers 27 are used for detecting human-related activity within a predetermined region around the vehicle. The region may be comprised of an area within 50 feet of the vehicle, for example. Human-related activity includes presence of or movement of people and/or human pets (e.g., dogs) since 1) the people or pets could be disturbed by the pest deterrence measures (e.g., sound or lights) that could otherwise be generated, and 2) the presence of people or pets could themselves repel animal pests from the area.

Controller 25 is coupled to an audio entertainment module 30 which drives onboard loudspeakers 31 and/or a panel exciter 32. Audio module 30 acts as an ultrasonic signal source to drive transducers 31 and/or 32 causing them to emit ultrasonic soundwaves at selected times. Controller 25 is coupled to an ambient light sensor (ALS) 33 in order to detect nighttime conditions (e.g., so that pest control functions can be optionally limited to operation at night).

In some embodiments, pest deterrence can further employ perimeter sensors 34 to intermittently monitor for pest activity and to activate deterrence accordingly. For example, ultrasonic emission can be activated in response to detected pests, or a vehicle horn 35 can be activated to scare away the detected pests.

Controller 25 is coupled to a lighting module 36 which selectably activates lights 37 which may include exterior lights (running lights, signaling lights, and headlamps) and/or interior courtesy lights. Lights 37 can be activated in a light event (e.g., flashing of lights 37) to scare away a pest. In some embodiments, lighting module 36 selectably activates ultraviolet (UVC) LEDs 38 so that the resulting UVC illumination can be used to spot and/or eliminate insect pests.

Controller 25 may be adapted to provide pest repelling functions according to several different modes. Using HMI 26 (such as a touchscreen control panel), a user can generate a first user command which specifies when any particular mode is to be utilized as well as entering any other control parameters such as the type of deterrent actions to be taken (e.g., which transducers or other devices such as UVC LEDs to be utilized) and configuring wireless devices (e.g., key fobs, smartphones, or pet tags) to be monitored and/or contacted.

Figure 4:
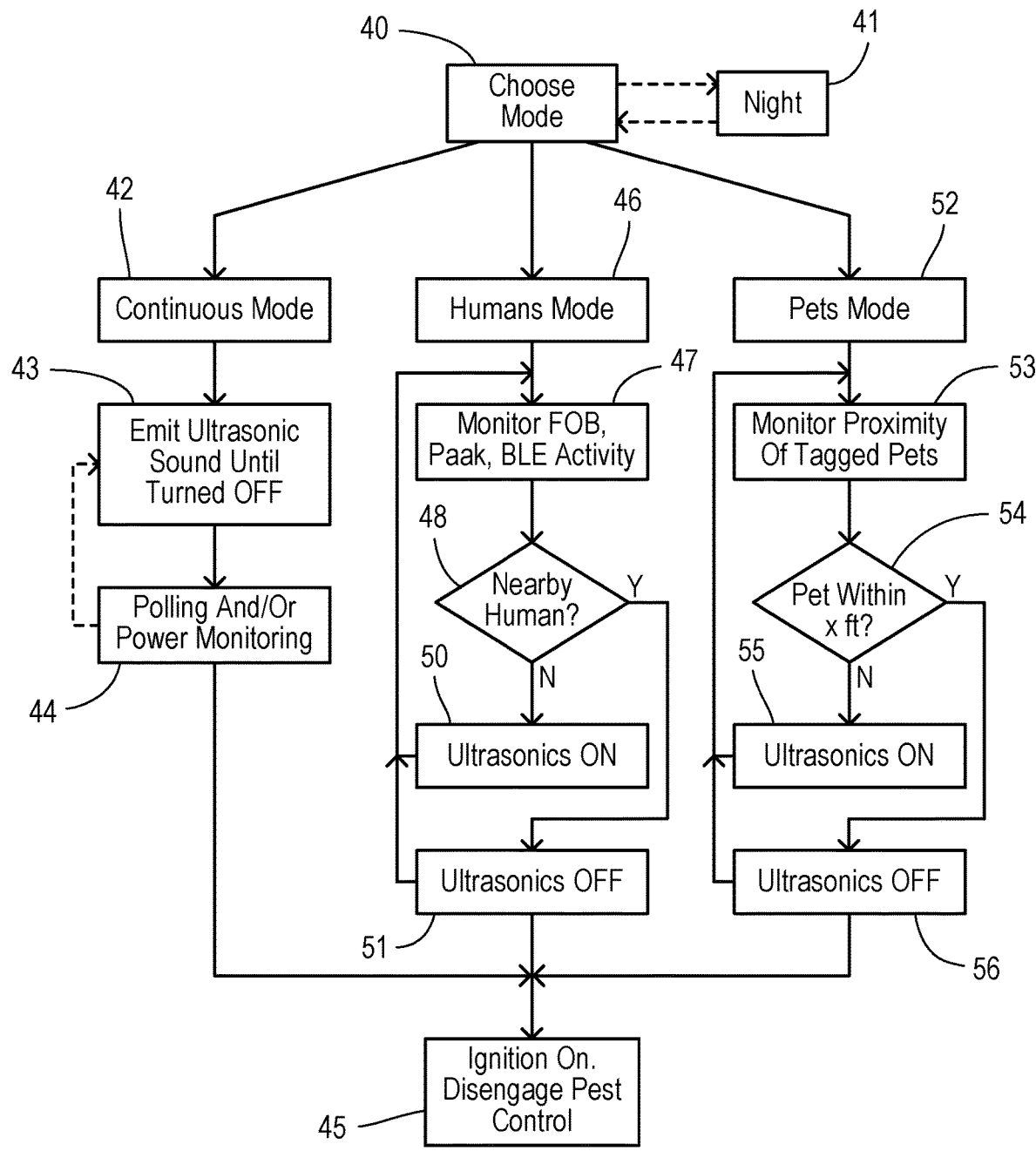
FIG. 4 is a flowchart showing one preferred method for controlling emission of ultrasonic soundwaves.

In some embodiments, a pest repeller feature can be implemented using four "pest deterrent" modes shown in FIG. 4, including a continuous mode, night-only mode, humans mode, and pets mode. FIG. 4 shows a flowchart in which a user-chosen mode is identified in step 40. When the continuous mode is chosen, operation follows a branch 42. In step 43, emission of ultrasonic soundwaves is activated until the function is turned off. During activation, a polling operation 44 can be performed in which ultrasound emission is conducted intermittently in order to reduce power consumption (e.g., battery drain). Operation 44 may further include power monitoring (e.g., based on a battery State-of-Charge) to automatically deactivate the pest deterrent actions when power reserve falls below a predetermined level.

A night mode 41 may operate similar to continuous mode 41 except that pest deterrence/repelling is only enabled during darkness. For example, an ambient light sensor may be used to detect a dark, nighttime environment. When the vehicle is parked and unoccupied, if the user command has activated the night mode then the controller confirms that it is dark (or waits until darkness) and begins emission of ultrasonic soundwaves from the chosen transducer(s). When the ambient light sensor again detects light levels above a threshold, then night mode would be deactivated and ultrasonic emission turned off. In either night mode or continuous mode, the pest deterrent mode may also be deactivated by a second user command at step 45 such as remote control commands to unlock a door or remote start the vehicle or an onboard user command such as activating an ignition switch.

A humans mode 46 and a pets mode 52 can be chosen according to a previous or current user command in step 40. Humans mode 46 and pets mode 52 monitor for human-related activity during the time that these pest deterrent modes are active to avoid pest deterring actions (such as ultrasonic emission, flashing of lights, honking a horn, or ultraviolet radiation) when humans or their pets are within a predetermined region around the vehicle. Humans mode 46 may be initiated by a user when there are no pets present, and pets mode 52 may be initiated by the user when they have brought a pet (e.g., a cat or a dog) on a camping trip, for example. Pets mode 52 may include monitoring for humans in the same manner that will be described for humans mode 46. Alternatively, humans mode 46 and pets mode 52 could be executed simultaneously so that the presence of either a human person or a pet results in deactivating the emission of ultrasonic soundwaves or other deterring measures.

In humans mode 46, wireless transceivers in the vehicle are used in step 47 to monitor for key fob transmissions, Phone-as-a-Key transmissions by a smartphone, or BLE or other RF transmissions of other devices which can be identified as being carried by a person. A check is performed in step 48 to determine whether any transmissions are received which indicate nearby human activity. If not, then the ultrasonic transducer(s) is turned on in step 50 and a return is made to step 47 to continue monitoring for human activity. If nearby human activity is detected in step 48, then the ultrasonic transducer(s) are turned off in step 51 and a return is made to step 47 to continue monitoring for human activity. At any time, a second user command may be generated (e.g., a remote start command or a door unlock command) which causes the pest control deterrent modes to be turned off in step 45.

In pets mode 52, the wireless transceivers are checked in step 53 to determine whether wireless tags (e.g., BLE devices or RF transponder tags mounted in a pet collar) are producing detectable transmissions. A check is performed in step 54 to determine whether a detected tag is within a predetermined proximity of the vehicle (e.g., within 50 feet). If not, then one or more ultrasonic transducers are turned on in step 55. If a pet is nearby, then the ultrasonic transducers are turned off in step 56. A return is made to step 53 to continue monitoring the locations of any tagged pets, unless a second user command terminates the pest deterrent mode in step 45.

In humans mode 46 and/or pets mode 52, the detection of a nearby human or pet (referred to herein as "human activity") can be based on other means of sensing. For example, a camera/imaging system can be used to monitor a region around the vehicle. Image processing techniques can be used to recognize a body of a human or pet which would result in turning off the ultrasonic transducers.

Figure 5:
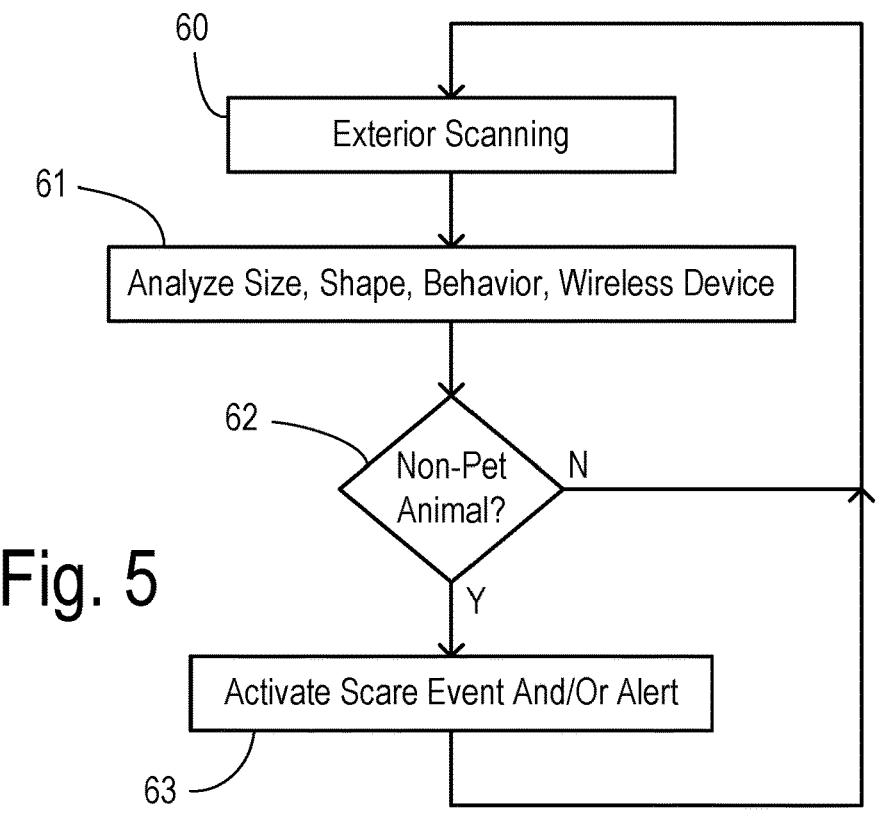
FIG. 5 is a flowchart showing a scanning method for repelling pests.

In some embodiments, pest deterrence/repelling can be enhanced by additional exterior scanning as shown in FIG. 5. An exterior scanning in step 60 can include use of a Macro Capacitive Sensor (MCS) mounted on an exterior of the vehicle (e.g., in a wheel well) and/or other perimeter sensors such as a camera or a radar sensor. Vehicle perimeter sensors can work together, such as performing intermittent checks for nearby object with the MCS, followed up by using a camera system once a potential object is detected by the MCS. In response to the exterior scanning, scan data concerning potential objects is analyzed in step 61 in order to identify size, shape, and behavior of detected objects and/or the identities of any wireless devices that are found. A check is performed in step 62 to determine whether the analyzed data indicates the presence of a non-pet animal (i.e., a pest). If not, then scanning continues in step 60. Analysis may include use of pattern recognition or other artificial intelligence techniques to classify a scanned object according to at least one class on nonhuman animals which are not a human pet. If a non-pet animal is detected and classified in steps 61 and 62, then a detection response is activated in step 63. The detection response can be a scare event in which a startling sound or flashing of lights is generated to scare off the pest. The detection response can also include an alert message being sent to a user (e.g., a text message to a driver's smartphone) so that the user can visit the vehicle to determine whether other action may be needed.

Figure 6:
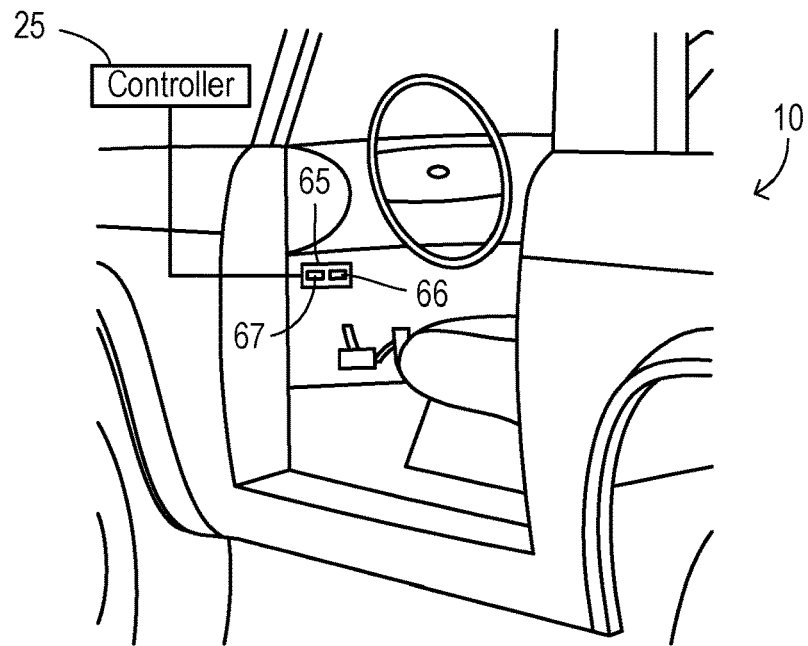
FIG. 6 is a perspective view of a passenger cabin with courtesy lighting and an ultraviolet light source.

In some embodiments, UVC emission can be used to further enhance pest repelling/deterrence. As shown in FIG. 6, controller 25 may be connected to an interior lighting module 65 which houses a visible light LED 66 for providing courtesy lighting and a UVC LED 67 for providing ultraviolet light able to make insects fluoresce for easy visual detection and/or to provide a fatal radiation exposure to insects that may be located within the passenger cabin.

Figure 7:
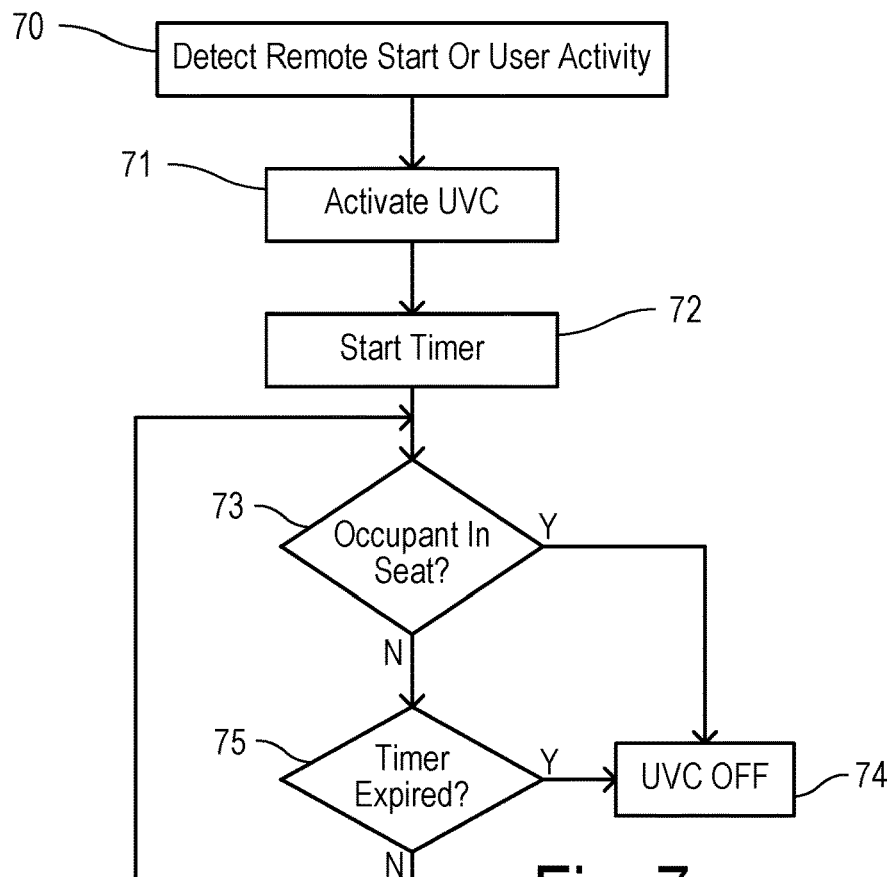
FIG. 7 is a flowchart showing a method of controlling ultraviolet lighting to neutralize insects.

FIG. 7 shows a corresponding method to provide UV illumination which may become active during any of the pest deterrent modes (e.g., during times when the vehicle is parked and unoccupied). In step 70, a user activity is detected to indicate that the user will shortly be accessing the vehicle. For example, the user may have pressed a remote start button on a key fob or initiated a request using a PaaK application on a smartphone. In response, the UVC LEDs in the vehicle are activated in step 71. To limit the illumination to providing no more than necessary for eliminating insect pests, a timer is started in step 72 (e.g., a 5-minute timer in order to eliminate scorpions). A check is performed in step 73 to determine whether a seat occupancy sensor indicates the presence of a person in the vehicle. Alternatively, a door ajar switch or other sensors can be used to detect a person. If a person is present, then the UVC LEDs are turned off in step 74. Otherwise, a check is performed in step 75 to determine whether the timer has expired. If so, then the UVC LEDs are turned off. If the timer has not expired, then the method continues to monitor for the arrival of a user or expiration of the timer.

What is claimed is:

1. A method of deterring pests at a vehicle, comprising the steps of:
   activating a pest deterrent mode in response to a first user command by emitting ultrasonic soundwaves from an onboard transducer driven by an ultrasonic signal source;
   monitoring a region around the vehicle for human-related activity within the region;

deactivating the emission of ultrasonic soundwaves when the human-related activity is detected;
resuming emission of the ultrasonic soundwaves when the human-related activity is no longer detected; and
deactivating the pest deterrent mode in response to a second user command.

2. The method of claim 1 wherein the monitoring for human-related activity is comprised of detecting communication between a mobile wireless device carried by a user and a wireless receiver onboard the vehicle.

3. The method of claim 2 wherein the mobile wireless device is comprised of a key fob, a smartphone, a Bluetooth device, or a UWB device.

4. The method of claim 1 wherein the monitoring for human-related activity is comprised of detecting communication between a mobile wireless device carried by a pet animal and a wireless receiver onboard the vehicle.

5. The method of claim 4 wherein the mobile wireless device is comprised of a pet collar carrying a wireless tag.

6. The method of claim 1 wherein the onboard transducer is comprised of a tweeter installed in the vehicle, and wherein the signal source is comprised of an audio entertainment system connected to the tweeter for music reproduction.

7. The method of claim 1 wherein the pest deterrent mode is activated only at night.

8. The method of claim 1 wherein the emission of ultrasonic soundwaves is conducted in a polling fashion for limiting electrical power consumption.

9. The method of claim 1 wherein the pest deterrent mode further comprises:
scanning the region using a remote sensor;
classifying objects detected by the scanning according to at least one class of nonhuman animals which are not a pet; and
generating a perceptible detection response when a detected object is classified as the one class.

10. The method of claim 9 wherein the detection response is comprised of at least one of a sound event for scaring off the detected object, a lighting event for scaring off the detected object, and a message sent to a user.

11. The method of claim 1 further comprising the steps of:
detecting user activity indicating preparation for use of the vehicle;
illuminating a passenger cabin of the vehicle with UVC light adapted to eliminate an insect pest; and
discontinuing illumination of the UVC light when a seat of the vehicle becomes occupied.

12. A passenger vehicle comprising:
a passenger cabin;
an onboard audio system adapted to generate an ultrasonic signal;
an onboard transducer mounted in the passenger cabin receiving the ultrasonic signal to emit ultrasonic soundwaves to repel pests;
a wireless receiver adapted to monitor a region around the vehicle for human-related activity within the region;
a controller responsive to a first user command to activate a pest deterrent mode in which the transducer is driven to emit the ultrasonic soundwaves, wherein the controller is coupled to the wireless receiver, wherein the controller deactivates the emission of ultrasonic soundwaves when the human-related activity is detected, wherein the controller resumes emission of the ultrasonic soundwaves when the human-related activity is no longer detected, and wherein the controller deactivates the pest deterrent mode in response to a second user command.

13. The passenger vehicle of claim 12 wherein the wireless receiver monitors for the human-related activity by detecting communication between a mobile wireless device carried by a user and the wireless receiver.

14. The passenger vehicle of claim 12 wherein the wireless receiver monitors for the human-related activity by detecting communication between a mobile wireless device carried by a pet animal and the wireless receiver.

15. The passenger vehicle of claim 12 wherein the transducer is comprised of a tweeter installed in the vehicle, and wherein the audio system further uses the transducer for music reproduction.

16. The passenger vehicle of claim 12 further comprising an ambient light sensor coupled to the controller, wherein the pest deterrent mode is activated only at night.

17. The passenger vehicle of claim 12 wherein the emission of ultrasonic soundwaves is conducted in a polling fashion for limiting electrical power consumption.

18. The passenger vehicle of claim 12 further comprising:
a remote sensor coupled to the controller and adapted to scan the region; and
an alerting device coupled to the controller;
wherein the controller classifies objects detected by the remote sensor according to at least one class of nonhuman animals which are not a pet, and wherein the controller commands the alerting device to generate a perceptible detection response when a detected object is classified as the one class.

19. The passenger vehicle of claim 18 wherein the detection response is comprised of a sound event or a light event for scaring off the detected object.

20. The passenger vehicle of claim 18 wherein the detection response is comprised of a message sent to a user.

* * * * *